(12) United States Patent
Mekid (10) Patent No.: US 7,997,001 B1
(45) Date of Patent: Aug. 16, 2011

(54) TELESCOPIC BALL BAR GAUGE

(75) Inventor: Samir Mekid, Manchester (GB)

(73) Assignee: King Fahd University of Petroleum and Minerals, Dharan (SA)

( * ) Notice: Subject to any disclaimer, the term of this patent is extended or adjusted under 35 U.S.C. 154(b) by 0 days.

(21) Appl. No.: 12/801,545

(22) Filed: Jun. 14, 2010

(51) Int. Cl.
*G01B 5/02* (2006.01)

(52) U.S. Cl. .......................................... 33/783; 33/787

(58) Field of Classification Search ................ 33/502, 33/706, 783, 787, 788, 789, 809, 810, 811, 33/812

See application file for complete search history.

(56) References Cited

U.S. PATENT DOCUMENTS

| | | | |
|---|---|---|---|
| 4,435,905 A | 3/1984 | Bryan | |
| 4,437,151 A | 3/1984 | Hurt et al. | |
| 4,492,036 A | 1/1985 | Beckworth | |
| 4,763,507 A | 8/1988 | Zofchak | |
| 5,214,857 A | 6/1993 | McMurtry | |
| 5,533,271 A | 7/1996 | Callaghan, Jr. | |
| 5,647,136 A | 7/1997 | Jostlein | |
| 5,813,128 A | 9/1998 | Bailey | |
| 5,873,175 A * | 2/1999 | Johnston | 33/809 |
| 6,269,544 B1 | 8/2001 | Pahk et al. | |
| 6,463,667 B1 | 10/2002 | Ushio et al. | |
| 6,732,445 B1 * | 5/2004 | Scoville | 33/809 |
| 7,040,033 B2 | 5/2006 | Zhu et al. | |
| 7,278,222 B2 | 10/2007 | Meier et al. | |
| 7,351,129 B2 | 4/2008 | Bird et al. | |
| 7,712,224 B2 * | 5/2010 | Hicks | 33/503 |
| 2003/0131490 A1 * | 7/2003 | Johansson et al. | 33/608 |
| 2008/0229601 A1 * | 9/2008 | Lightfoot | 33/700 |
| 2010/0229415 A1 * | 9/2010 | Knudsen | 33/613 |
| 2011/0071437 A1 * | 3/2011 | Merchant | 600/587 |

FOREIGN PATENT DOCUMENTS

WO WO9718436 A1 5/1997

* cited by examiner

*Primary Examiner* — G. Bradley Bennett
(74) *Attorney, Agent, or Firm* — Richard C. Litman (57) ABSTRACT

The telescopic ball bar gauge provides a pair of movable test measuring points that are spaced apart a known distance so that the points may be contacted by a machine probe of a coordinate measuring machine or the like to generate test data. This allows varying inaccuracies within the machine to be detected and accounted for during normal operation of the machine. The telescopic ball bar gauge includes a plurality of telescoping segments forming at least one linear variable differential transformer. The at least one linear variable differential transformer is used to measure the linear distance between two balls mounted on opposed ends of the ball bar gauge. A transmitter in communication with the at least one linear variable differential transformer transmits a measurement signal representing the linear distance between the two balls.

20 Claims, 5 Drawing Sheets

TELESCOPIC BALL BAR GAUGE

BACKGROUND OF THE INVENTION

1. Field of the Invention

The present invention relates measuring and testing devices, and particularly to a telescopic ball bar gauge for testing and calibrating small scale numerical controlled machine tools, coordinate measuring machines and the like.

2. Description of the Related Art

Figure 2:
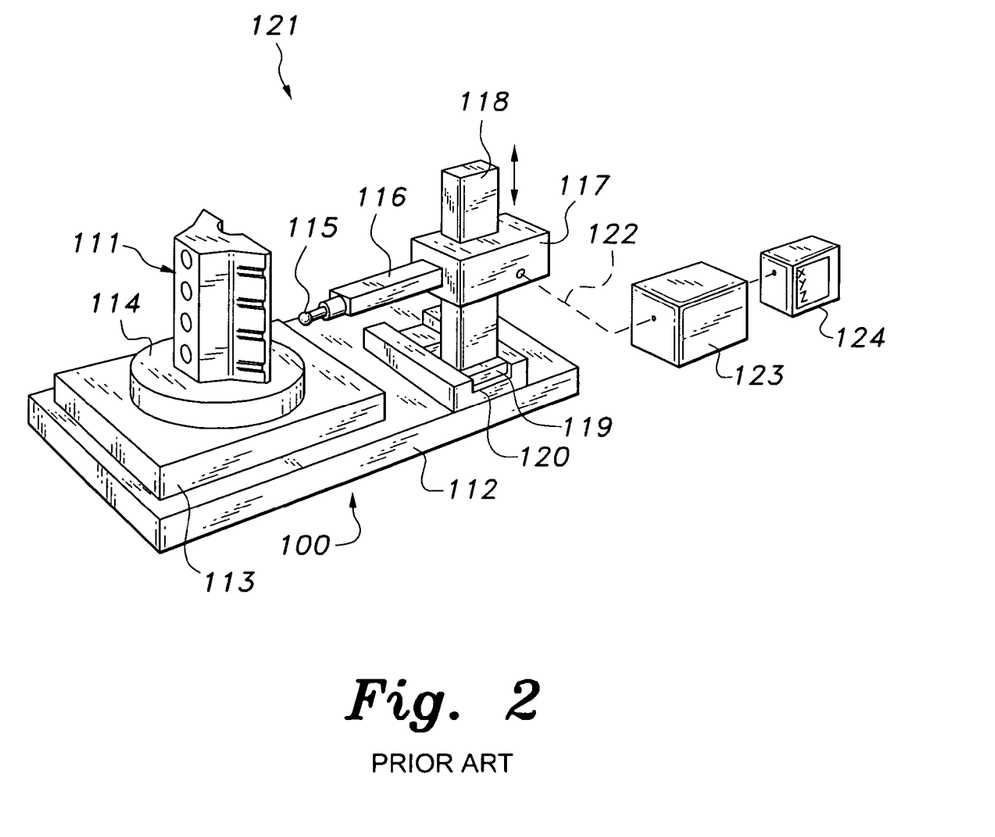
FIG. 2 is a perspective view of a typical coordinate measuring machine according to the prior art.

FIG. 2 illustrates a typical prior art coordinate measuring machine (CMM) 100. A coordinate measurement machine is typically used to map or measure the shape and dimensions of an article. For this purpose, such a CMM often includes a measuring envelope or chamber within which the article to be measured is positioned, such as upon a suitable support or base. A probe is then moved within the measuring envelope to contact either preselected points or randomly selected points upon the article. The movements of the probe are recorded and may be translated into three-dimensional readings, as for example, into X-, Y-, and Z-axis readings, or into other useful data. Thus, when the probe contacts a point on the surface of the article, a signal is produced that is converted into coordinate measurements or other data through a suitably programmed computer.

The measurements produced by the coordinate measuring machine probe contacting the article may be used for a variety of purposes, including producing drawings of the article, determining surface shapes or contours, assisting in designing the article, determining dimensions and volumes, etc. The sizes and construction of coordinate measurement machines may vary, but typically they are of a substantial size in order to measure substantial size items. For example, a coordinate measurement machine may be used to measure an automotive engine block, or it may be used to measure an automobile body or similarly large articles.

Because accurate measurements are usually required, the accuracy of the coordinate measuring machine itself must be periodically tested. For that purpose, a suitable gauge is needed for producing test data generated by test movements and contacts of the probe. That test data can be used to determine equipment inaccuracies and needed compensations for any such inaccuracies.

The probe in a coordinate measurement machine is typically mounted upon an arm connected to a movable support system by which the probe may be moved three-dimensionally within the envelope or chamber or volumetric area within which the measuring is performed. Thus, inaccuracies may arise because of varying tolerances or dimensional inaccuracies of the parts of the probe support system. Such inaccuracies may vary at different places or probe positions within the envelope. It is desirable to provide a gauge system that can be used to determine the accuracy of the probe-generated measurements between spaced-apart points located at numerous places within the envelope. This is particularly necessary because the magnitude of measurement inaccuracies may change materially at the outer areas of the measuring envelope as compared with central locations of the envelope due to greater movements of the probe support system at the outer areas.

FIG. 2 schematically illustrates a coordinate measuring machine 100 that is used to measure the shapes and dimensions of surfaces of an article, such as an engine block 111, or a larger article, such as an automobile body or body part, or smaller articles. The machine 100 includes a floor or platform 112 upon which a base 113 is located for supporting a support plate 114 upon which the article is positioned.

The article is repeatedly contacted by a probe 115, which is mounted upon an arm 116 that moves towards and away from the article. The arm 116 is carried by an arm support block 117, which is slidably mounted upon a vertical post 118 for upwards and downwards movement, as indicated by the double-headed arrow adjacent the end of the block 117. The post 118 is carried by a post support base 119, which is slidably positioned within a post base guide channel 120 for reciprocal movement, as indicated by the double-headed arrow at the guide channel 120.

The construction of coordinate measuring machines may vary considerably, but the general construction and operation of a typical CMM involves a probe, which is mounted for movement relative to the article to be measured so that the probe can contact selected portions of the article and the movements and locations of the probe can be detected. The article itself is contained within a measuring "envelope" or chamber; i.e., the area surrounding the article. In practice, the chamber or envelope 121 may be formed by a walled, room-like area. Further, although the probe 115 is shown in FIG. 2 as being mounted for three-dimensional movement by the inward and outward movement of the arm 116 carrying the probe 115, the up and down movement of the block 117 carrying the arm 116 and the backwards and forward movement of the post 118 to which the arm 116 is connected, the probe 115 may also be mounted upon a more universally movable support, such as a conventional X-Y or X-Y-Z movable stage, as is conventionally known.

The movement of the probe 115 in contacting various parts of the article 111 may be controlled either manually or by a suitable mechanism located remotely from the probe 115. When the probe 115 contacts the article 111, a signal is transmitted through a wiring system 122 to a computer 123, which provides data that is read out through a printer or screen or the like 124, or is otherwise used in some other data-responsive equipment. It should be understood that the computer 123 and the display or interface 124 are schematically illustrated to show the general relationship of the relevant components.

Figure 1:
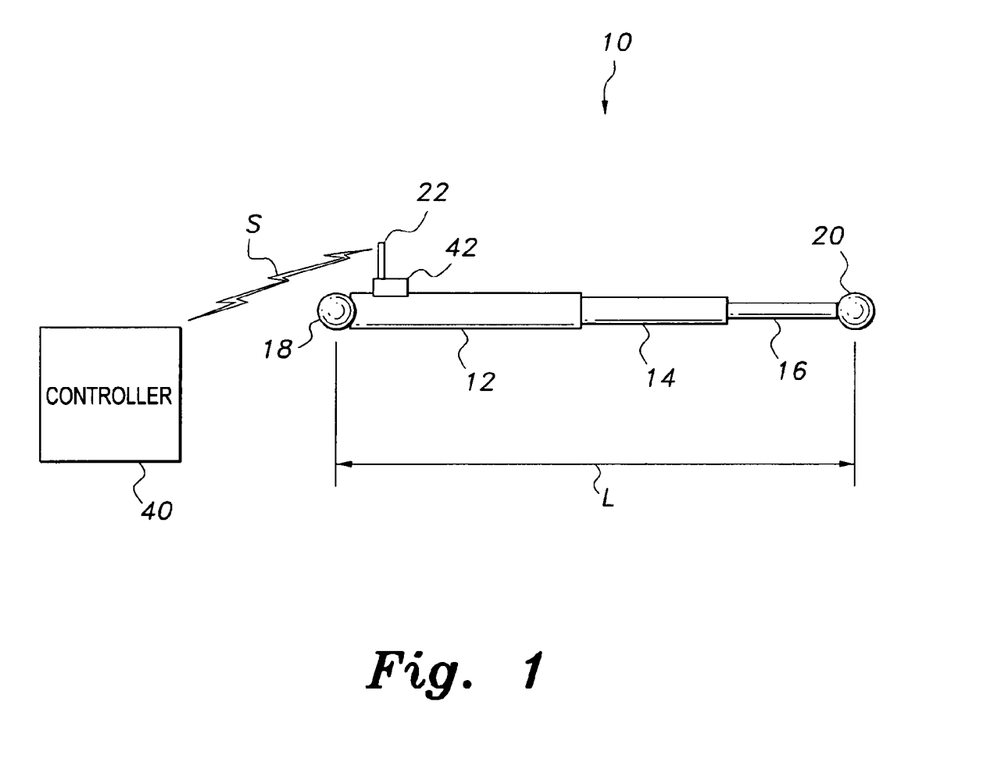
FIG. 1 is a diagrammatic view of a telescopic ball bar gauge according to the present invention.

In using a coordinate measuring machine, such as that illustrated in FIG. 1, close accuracy of the readings is required. However, the nature of the equipment, including the tolerances required in making the parts of the equipment, as well as the looseness of the parts resulting from wear, affects the accuracy of the readings. Thus, the generated measurement readings may be more or less accurate at various places within the measuring envelope or chamber. For example, locations that are central within the chamber are likely to be more accurate than places located along the edges or outer fringes of the measuring envelope, where more probe movement is needed. These discrepancies or inaccuracies in measurements can substantially affect the data produced and later uses of that data. Thus, it is important to know, by fairly regularly taking test measurements, the varying inaccuracies of the equipment, including at different places within the measuring envelope, so that these inaccuracies can be considered when utilizing the data produced by the machine.

In order to test the accuracy of a coordinate measuring machine, a ball bar gauge is typically used. A conventional ball bar gauge provides a pair of movable test measuring points that are spaced apart a known distance so that the points may be contacted by the probe of a coordinate measuring machine to generate test data. Typically, the ball bar gauge is in the form of a movable device that can be periodically placed within a measuring envelope of the CMM, and can be moved into a variety of test measuring positions, and then removed from the CMM.

Figure 3:
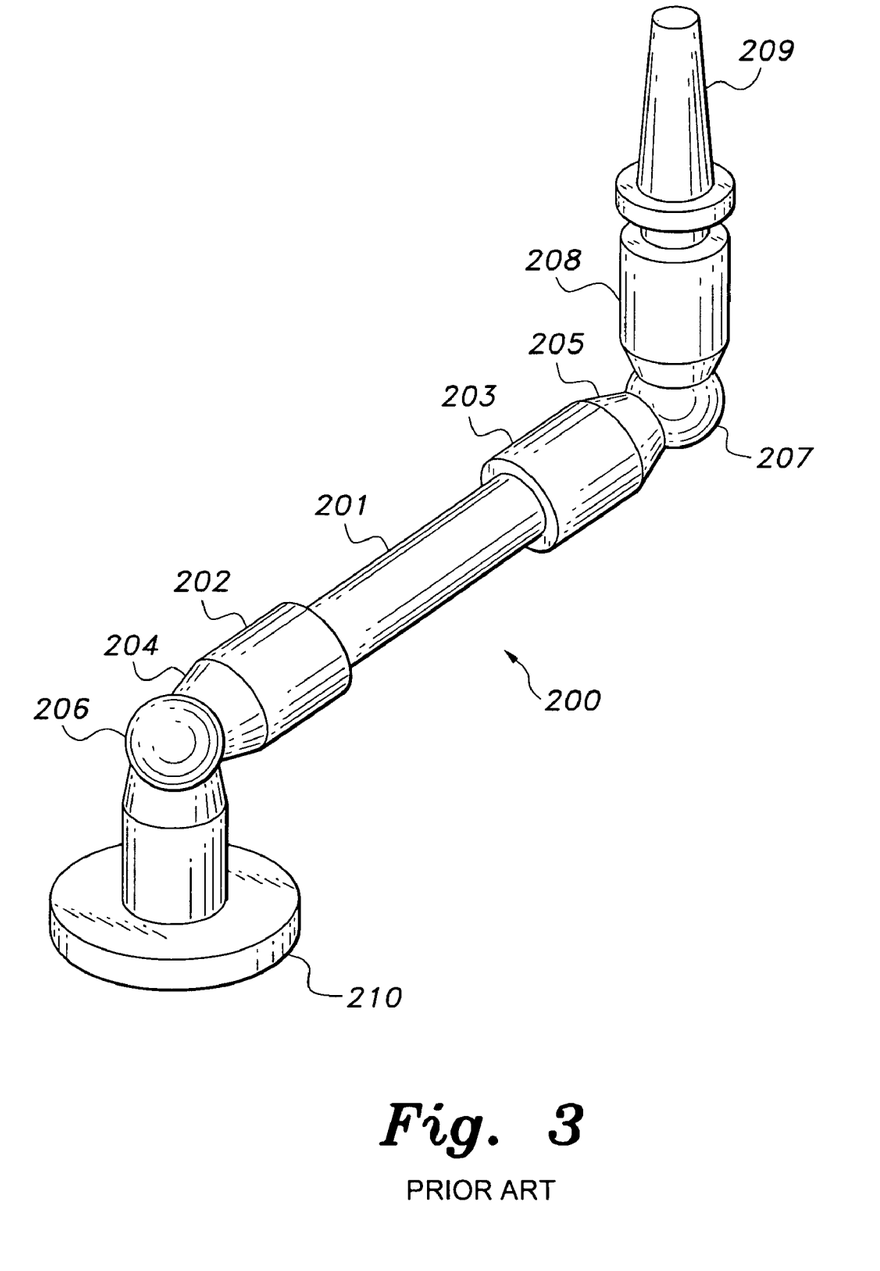
FIG. 3 is a perspective view of a typical ball bar gauge according to the prior art.

FIG. 3 illustrates a typical prior art magnetic ball bar gauge 200 for evaluating the performance of coordinate measuring machines, such as the CMM 100 of FIG. 2. In use, a fixed magnetic socket 210 is mounted on a coordinate measuring machine workpiece supporting surface (such as the support plate 114 of FIG. 2), and a tapered insert 209 of the free socket 208 is mounted in the coordinate measuring machine probe holder (either by attachment of a socket to the probe 115, or by removal of the probe 115 and attachment to the arm 116). Tooling balls 206 and 207 are then placed in the sockets 208 and 210. The tooling balls 206 and 207 are conventional spherical tooling balls that have tolerances well below the tolerances intended to be measured. Ball bar gauge 200 is then placed on balls 206 and 207, where it is held by magnetic attraction from the magnets in the chucks 202 and 203.

A rod 201 is attached to the two magnetic chucks 202 and 203 at either end. Each of the chucks 202 and 203 has tapered ends 204 and 205, respectively, which provide clearance between the chucks 202 and 203, and the sockets 208 and 210 when the bar 200 is moved into different positions in accordance with standard measuring procedures.

FIG. 2 illustrates a conventional CMM for providing measurements of a large-scale object, such as the exemplary engine block 111. A ball bar gauge for testing the accuracy of such a CMM, such as the gauge 200 of FIG. 3, which largely relies on mechanical measurement, would be dimensioned and configured on an equivalent scale. However, a conventional ball bar gauge, such as the gauge 200, would not be able to provide accurate readings for microscale CMMs, which require a far greater level of accuracy, as well as a far smaller size.

Ball bars and their use in calibrating machines are well known in the art. U.S. Pat. No. 4,435,905, to Bryan, illustrates a typical exemplary ball bar system, which is herein incorporated by reference in its entirety. This system consists of a telescopic rod having a ball at each end, and which can be positioned between a socket carried by the spindle of a machine, and a socket mounted on the machine table. The spindle is driven around in a circle about the center of the table-mounted socket, for example in a horizontal, x,y plane, and measurements are made of any change in length of the ball bar by means of a transducer in, or on, the telescopic rod.

The most accurate calibration of the errors in the spindle movement around the circle are obtained when the axis of the ball bar lies in a plane which includes the centre of the ball in the socket, because then errors in the movement of the spindle along its axis do not affect the length of the ball bar. Thus, the results of the test reflect only errors of movement of the spindle in the x,y plane.

It is possible to make some measurement of errors in the spindle movement in the vertical x,z or y,z planes through the centre of the ball in the table-mounted socket, but with the apparatus set up as described above, the spindle cannot move through more than 180° in these planes without coming into contact with the ball bar or the socket support.

A circle through 360° can be made by the spindle in a vertical plane alongside the table-mounted socket, and sufficiently offset from the socket that such contact of the spindle with the socket or the ball bar is avoided. However, with this set up the ball bar will lie at an angle to the vertical plane, and its length can be varied by movements of the spindle in the horizontal plane which can give rise to errors in the calibration of the vertical plane.

Alternatively, the socket could be repositioned so that it is possible to enable the spindle to perform a 360° circle centered on the ball in the socket and with the ball bar lying in a vertical plane through the centre of the ball in the socket. This, however, has disadvantages, particularly when acting in all three planes, where three separate operations may be needed. This is time-consuming in itself and, further, three different positions may be required for the socket, thus causing calibrations which are not performed about the same center and, thusly, are not easily correlated.

It would be desirable to provide an apparatus for calibrating all three planes of a machine and which allows a ball bar in a machine spindle to be driven around 360° separately in each of three orthogonal planes of the machine with the ball bar centered on a single fixed position, and with the axis of the ball bar lying in the respective calibration plane each time.

Additionally, presently available ball bars can neither test nor calibrate the new generations of micro-machine tools and micro-CMMs because of their relatively large dimensions and bulky prototypes. It would be desirable to provide a telescopic ball bar which could be used to easily test and calibrate such machines, in particular, and also be used with standard scale machines. Thus, a telescopic ball bar gauge solving the aforementioned problems is desired.

SUMMARY OF THE INVENTION

The telescopic ball bar gauge is utilized to provide a pair of movable test measuring points that are spaced apart a known distance so that the points may be contacted by a machine probe of a coordinate measuring machine or the like to generate test data. This allows varying inaccuracies within the machine to be detected and accounted for during normal operation of the machine. The telescopic ball bar gauge is in the form of an easily movable device that can be periodically placed within a measuring envelope of the coordinate measuring machine, and can be moved into a variety of test measuring positions and then removed from the machine. The telescopic ball bar gauge is preferably wireless and is used for testing and calibrating small scale numerical controlled machine tools, coordinate measuring machines and the like, and includes a double telescopic gauge which provides accurate readings for a relatively small range of measurement, typically on the order of less than 50 mm.

The telescopic ball bar gauge includes a telescopic rod having first, second and third telescopic segments. A plurality of first annular solenoid coils are mounted in the first telescopic segment, the first annular solenoid coils being mounted about a first central tube. The second telescopic segment is slidable within the first central tube to form a first linear variable differential transformer. Similarly, a plurality of second annular solenoid coils are mounted in the second telescopic segment, the second annular solenoid coils being mounted about a second central tube. The third telescopic segment is slidable within the second central tube to form a second linear variable differential transformer.

A first ball is mounted to a free end of the first telescopic segment and a second ball is mounted to a free end of the third telescopic segment. The first and second linear variable differential transformers generate a measurement signal representing a linear distance between the first and second balls. A transmitter, which may be wired or wireless, is in communication with the first and second linear variable differential transformers to transmit the measurement signal. Preferably, the first, second and third segments are relatively flexible.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The telescopic ball bar gauge 10 is utilized to provide a pair of movable test measuring points that are spaced apart a known distance so that the points may be contacted by a machine probe of a coordinate measuring machine or the like to generate test data. This allows varying inaccuracies within the machine to be detected and accounted for during normal operation of the machine. The telescopic ball bar gauge is preferably wireless and is used for testing and calibrating small scale numerical controlled machine tools, coordinate measuring machines, robots and the like, and includes a double telescopic gauge which provides accurate readings for a relatively small range of measurement, typically on the order of less than 50 mm. As shown in FIG. 1, the telescopic ball bar gauge 10 includes first, second and third telescoping segments 12, 14, 16 forming an adjustable-length central rod, similar to the rod 201 of FIG. 3. It should be understood that any suitable number of telescoping segments may be used, and that the three segments shown in FIG. 1 are shown for exemplary purposes only.

A first ball 18 is mounted on the free end of first segment 12 and a second ball 20 is mounted on the free end of third segment 16. It should be understood that the balls 18, 20 may be secured to the respective telescopic segments by any suitable method of attachment, such as adhesives or the like. The first ball 18 is similar to ball 206 of FIG. 3 and may be attached to a magnetic chuck and support mounted within the envelope of the CMM to be tested. The second ball 20 may be directly and releasably attached to the probe or probe arm of the CMM to be tested, or may have an additional insert mounted thereon, such as insert 209, depending upon the nature of the machine to be tested. The second ball 20 and/or the additional insert are preferably releasably held to the probe or probe arm of the machine to be tested by a magnetic socket or the like. The telescopic ball bar gauge 10 is dimensioned and configured for testing of a microscale CMM or the like, and the length L in FIG. 1 (with segments 12, 14, 16 fully extended) preferably has a maximum length of approximately 55 mm. When fully collapsed, the length of the gauge preferably has a maximum length of approximately 20 mm.

Figure 4:
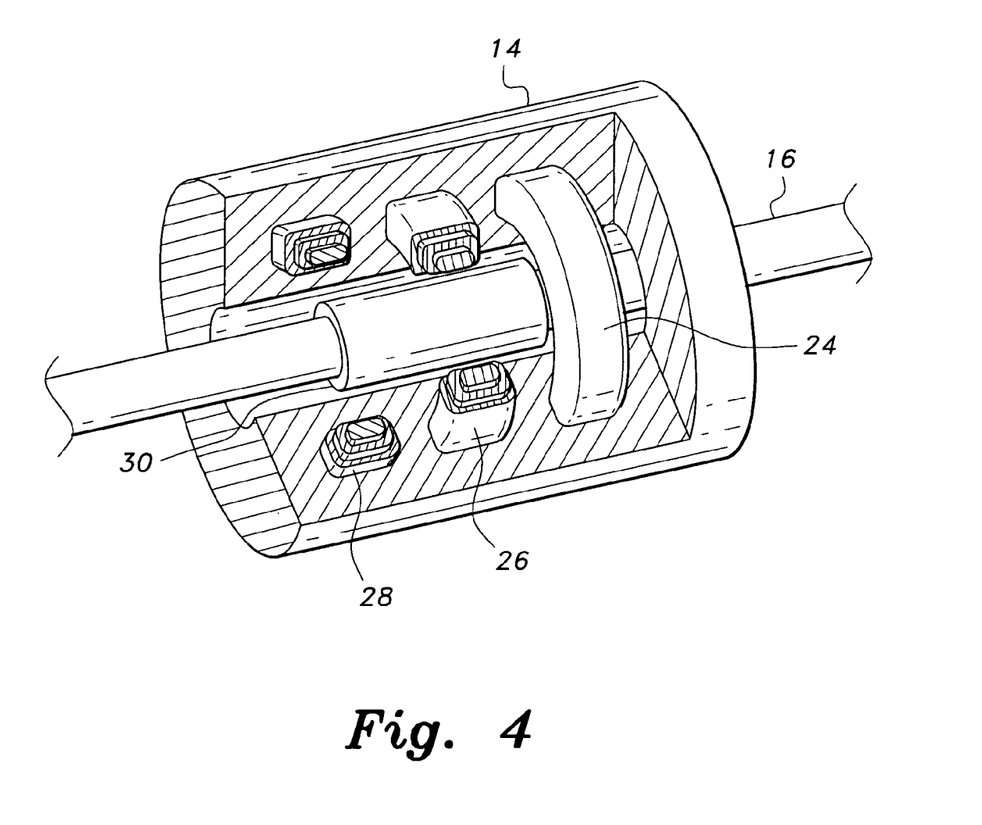
FIG. 4 is a partial perspective view of a telescoping segment of the telescopic ball bar gauge according to the present invention, broken away and partially in section to show details thereof.

The measurement between the centers of the first ball 18 and the second ball 20 (which is used to provide the testing data) is performed through accurate measurement of the extension of the second segment 14 and the third segment 16 with respect to one another. To this end, the first segment 12 and the second segment 14 are preferably linear variable differential transformers (LVDTs). FIG. 4 illustrates a section view of the second segment 14, although it should be understood that the first segment 12 includes a similar LVDT structure.

As shown in FIG. 4, the linear variable differential transformer of the second segment 14 (and also of the first segment 12) is an electrical transformer used for measuring linear displacement. As is conventional in LVDTs, three solenoid coils 24, 26, 28 are placed end-to-end around a central tube 30. The central coil 26 is the primary coil, and the two outer coils 24, 28 are the secondary coils. The third segment 16 forms a cylindrical ferromagnetic core, which slides along the axis of the tube 30 and is slidably held therein (similarly, the second segment 14 forms a solenoid core slidable through a similar central tube encircled by three solenoid coils within the first segment 12 to measure extension of the second segment 14).

An alternating current provided by any suitable external power source is driven through the primary coil 26, causing a voltage to be induced in each secondary coil 24, 28 proportional to its mutual inductance with the primary coil 26. The frequency is typically in the range of 1 to 10 kHz. As the cylindrical ferromagnetic core forming the third segment 16 moves, these mutual inductances change, causing the voltages induced in the secondary coils 24, 28 to change. The coils are connected in reverse series, so that the output voltage is the differential between the two secondary voltages. When the core, or third segment 16, is in its central position, equidistant between the two secondary coils 24, 28, equal but opposite voltages are induced in these two coils, so the output voltage is zero.

When the core is displaced in one direction, the voltage in one coil increases as the other decreases, causing the output voltage to increase from zero to a maximum. This voltage is in phase with the primary voltage. When the core moves in the other direction, the output voltage also increases from zero to a maximum, but its phase is opposite to that of the primary. The magnitude of the output voltage is proportional to the distance moved by the core (third segment 16) up to its limit of travel. The phase of the voltage indicates the direction of the displacement.

Preferably, the sliding third segment 16 does not touch the inside of the tube 30, thus greatly reducing friction and allowing the LVDT to make highly reliable linear distance measurements. The absence of any sliding or rotating contacts allows the LVDT to be completely sealed against the environment. LVDTs are commonly used for position feedback in servomechanisms, for automated measurement in machine tools, and many other industrial and scientific applications, and it should be understood that the first and second segments 12, 14 may use any suitable type of LVDT to provide accurate measurements of the distance between the centers of the first ball 18 and the second ball 20.

The measurement of distance generated by the LVDTs of the first and second segments 12, 14 is then transmitted to a separate controller 40. In FIG. 1, a transmitter 42 with antenna 22 mounted on the side of the first segment 12 is shown transmitting a wireless signal S to a controller 40, although it should be understood that any suitable type of wired or wireless transmitter or transceiver may be mounted on first segment 12 for transmitting the measurement data generated by the LVDTs of the first and second segments 12, 14. It should be understood that any suitable type of transmitter or transceiver may be used for generating signal S, which may be a wireless signal, broadcast with a Bluetooth protocol, a ZigBee protocol, or any other suitable type of radio transmission, or may be a wired signal.

Figure 5:
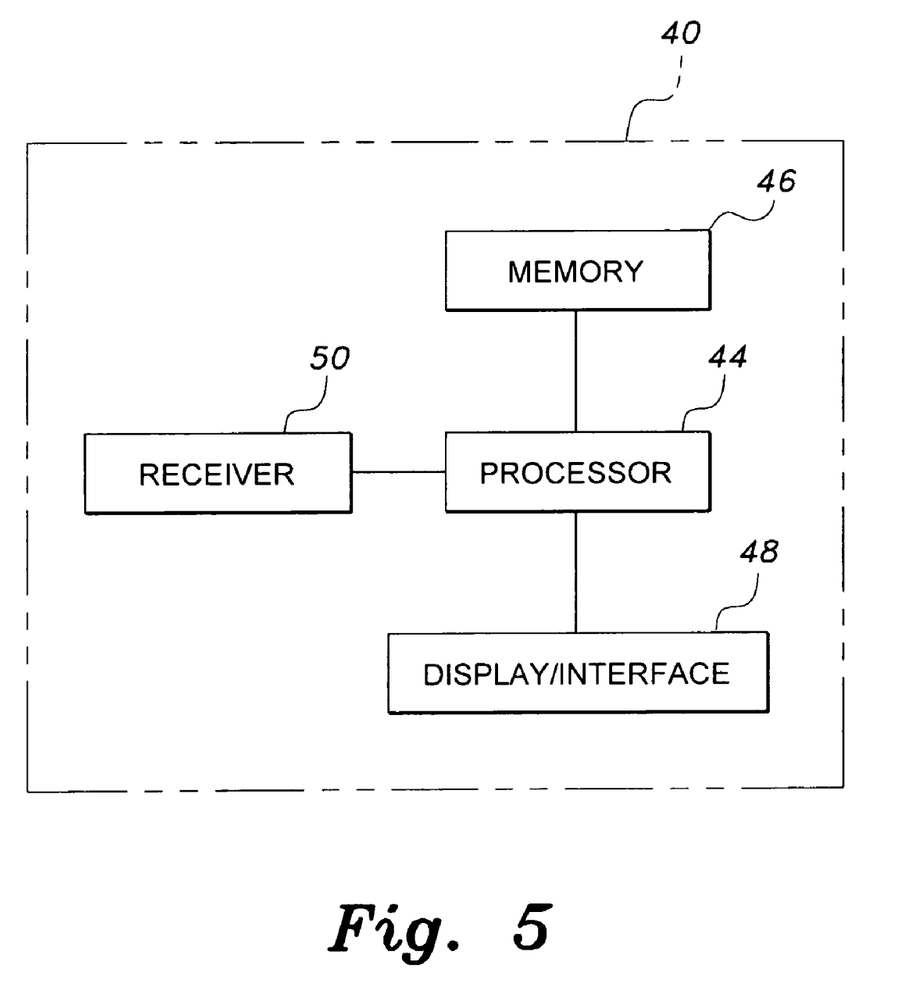
FIG. 5 is a block diagram illustrating the processing components of a controller of the telescopic ball bar gauge according to the present invention.

As shown in FIG. 5, the controller 40 preferably includes a processor 44 in communication with computer readable memory 46, an interface (including a display) 48, and a receiver or transceiver for receiving the measurement signal S generated by the transmitter 42. Data or instructions may be entered by the user into the controller 40 via an interface 48, which may be any suitable type of user interface, and may be stored in memory 46, which may be any suitable type of computer readable and programmable memory. Any necessary calculations are performed by the processor 44, which may be any suitable type of computer processor, digital signal processor, or the like, and may be displayed to the user on the display associated with interface 48, which may be any suitable type of computer display.

The processor 44 may be associated with, or incorporated into, any suitable type of computing device, for example, a personal computer or a programmable logic controller. The display and interface 48, the processor 44, the memory 46, the receiver 50 and any associated computer readable recording media are in communication with one another by any suitable type of data bus, as is well known in the art. Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 46, or in place of memory 46, include a hard disk device (HDD), a flexible disk (FD), and a magnetic tape (MD). Examples of the optical disk include a DVD (Digital Versatile Disc), a DVD-RAM, a CD-ROM (Compact Disc-Read Only Memory), and a CD-R (Recordable)/RW.

Preferably, segments 12 and 14 and, optionally, segment 16 are relatively flexible, allowing the gauge 10 to be used to test a minimum workspace having a volume of 20 mm by 20 mm by 20 mm (corresponding to the minimum length of each segment). The first and second balls 18, 20 may be formed from any suitable material, such as stainless steel. It should be understood that the LVDTs may be in communication with any suitable type of signal conditioner, which may be integrated into the transceiver 42, to generate a signal corresponding to a particular distance measurement. Further, as noted above, although illustrated as having three segments, the gauge 10 may include only two segments (with the first segment containing an LVDT), or may have additional segments, depending upon the particular size and dimensions of the machine to be tested.

It is to be understood that the present invention is not limited to the embodiments described above, but encompasses any and all embodiments within the scope of the following claims.

I claim:

1. A telescopic ball bar gauge, comprising:
   a telescopic rod having first and second telescopic segments;
   first, second and third annular solenoid coils mounted within the first telescopic segment, the first, second and third annular solenoid coils being mounted about a central tube, the second telescopic segment being slidable within the central tube to form a linear variable differential transformer; and
   first and second balls, the first ball being mounted to a free end of the first telescopic segment, the second ball being mounted to a free end of the second telescopic segment;
   wherein the linear variable differential transformer generates a measurement signal corresponding to a linear distance between the first and second balls.

2. The telescopic ball bar gauge as recited in claim 1, further comprising means for transmitting the measurement signal.

3. The telescopic ball bar gauge as recited in claim 2, wherein said means for transmitting the measurement signal comprises a wireless transmitter in communication with the linear variable differential transformer.

4. The telescopic ball bar gauge as recited in claim 2, wherein said first telescopic segment is substantially flexible.

5. The telescopic ball bar gauge as recited in claim 4, wherein said second telescopic segment is substantially flexible.

6. The telescopic ball bar gauge as recited in claim 5, wherein each of said first and second balls is formed from stainless steel.

7. The telescopic ball bar gauge as recited in claim 1, wherein the linear distance between said first and second balls is less than about 50 mm when said telescopic rod is fully extended.

8. The telescopic ball bar gauge as recited in claim 7, wherein the linear distance between said first and second balls is greater than approximately 20 mm when said telescopic rod is fully collapsed.

9. A telescopic ball bar gauge, comprising:
   a telescopic rod having first, second and third telescopic segments;
   a plurality of first annular solenoid coils mounted in the first telescopic segment, the plurality of first annular solenoid coils being mounted about a first central tube, the second telescopic segment being slidable within the first central tube to form a first linear variable differential transformer;
   a plurality of second annular solenoid coils mounted in the second telescopic segment, the plurality of second annular solenoid coils being mounted about a second central tube, the third telescopic segment being slidable within the second central tube to form a second linear variable differential transformer; and
   first and second balls, the first ball being mounted to a free end of the first telescopic segment, the second ball being mounted to a free end of the third telescopic segment;
   wherein the first and second linear variable differential transformers generate a measurement signal corresponding to linear distance between the first and second balls.

10. The telescopic ball bar gauge as recited in claim 9, further comprising means for transmitting the measurement signal.

11. The telescopic ball bar gauge as recited in claim 10, wherein said means for transmitting the measurement signal comprises a wireless transmitter in communication with the first and second linear variable differential transformers.

12. The telescopic ball bar gauge as recited in claim 10, wherein said first telescopic segment is substantially flexible.

13. The telescopic ball bar gauge as recited in claim 12, wherein said second telescopic segment is substantially flexible.

14. The telescopic ball bar gauge as recited in claim 13, wherein said third telescopic segment is substantially flexible.

15. The telescopic ball bar gauge as recited in claim 14, wherein each of said first and second balls is formed from stainless steel.

16. The telescopic ball bar gauge as recited in claim 9, wherein the linear distance between said first and second balls is less than about 50 mm when said telescopic rod is fully extended.

17. The telescopic ball bar gauge as recited in claim 16, wherein the linear distance between said first and second balls is greater than about 20 mm when said telescopic rod is fully collapsed.

18. A telescopic ball bar gauge, comprising:

a telescopic rod having a plurality of telescopic segments, the plurality of telescopic segments including at least a first segment and a sliding end segment;

at least one set of annular solenoid coils mounted in one of said telescopic segments adjacent the sliding end segment, the at least one set of annular solenoid coils being mounted about at least one central tube, the sliding end segment being slidably received within the at least one central tube to form at least one linear variable differential transformer; and first and second balls, the first ball being mounted to a free end of the first segment, the second ball being mounted to a free end of the sliding end segment;

wherein the at least one linear variable differential transformer generates a measurement signal corresponding to linear distance between the first and second balls.

19. The telescopic ball bar gauge as recited in claim 18, further comprising means for transmitting the measurement signal.

20. The telescopic ball bar gauge as recited in claim 19, wherein said means for transmitting the measurement signal comprises a wireless transmitter in communication with the first and second linear variable differential transformers.

* * * * *